United States Patent
Yaguchi

(10) Patent No.: US 10,177,394 B2
(45) Date of Patent: Jan. 8, 2019

(54) FUEL CELL SYSTEM AND FUEL CELL CONTROL METHOD

(71) Applicant: NISSAN MOTOR CO., LTD., Yokohama-shi, Kanagawa (JP)

(72) Inventor: Tatsuya Yaguchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/756,740

(22) PCT Filed: Sep. 4, 2015

(86) PCT No.: PCT/JP2015/075176
§ 371 (c)(1),
(2) Date: Mar. 1, 2018

(87) PCT Pub. No.: WO2017/037938
PCT Pub. Date: Mar. 9, 2017

(65) Prior Publication Data
US 2018/0248210 A1    Aug. 30, 2018

(51) Int. Cl.
*H01M 8/04992*    (2016.01)
*H01M 8/04089*    (2016.01)
*H01M 8/04007*    (2016.01)
*H01M 8/04701*    (2016.01)
*C01B 3/38*    (2006.01)
*H01M 8/0432*    (2016.01)
*H01M 8/0438*    (2016.01)
(Continued)

(52) U.S. Cl.
CPC ........... *H01M 8/04992* (2013.01); *C01B 3/38* (2013.01); *H01M 8/0432* (2013.01); *H01M 8/04067* (2013.01); *H01M 8/04089* (2013.01); *H01M 8/04425* (2013.01); *H01M 8/04582* (2013.01); *H01M 8/04701* (2013.01); *H01M 8/04731* (2013.01); *H01M 8/04776* (2013.01); *H01M 8/04902* (2013.01); *H01M 8/0618* (2013.01); *C01B 2203/0227* (2013.01); *C01B 2203/066* (2013.01); *C01B 2203/169* (2013.01); *H01M 2250/20* (2013.01)

(58) Field of Classification Search
CPC ................................................ H01M 8/04992
See application file for complete search history.

(56) References Cited

U.S. PATENT DOCUMENTS

2006/0172176 A1    8/2006    MacBain et al.
2012/0270124 A1    10/2012    Masui et al.

FOREIGN PATENT DOCUMENTS

EP    1507302 A2    2/2005
EP    2 246 926 A1    11/2010
(Continued)

*Primary Examiner* — Sarah A Slifka
(74) *Attorney, Agent, or Firm* — Foley & Lardner LLP

(57) ABSTRACT

In a fuel cell system, a preceding-stage fuel cell and a following-stage fuel cell are connected via a fuel flow path. The fuel cell system includes a reformer that supplies reformed gas to the preceding-stage fuel cell; an acquisition unit that acquires the amount of heat generation and the amount of heat absorption of the preceding-stage fuel cell; and a control unit that controls at least one of the amount of current of the preceding-stage fuel cell, the flow rate of air to be supplied to the reformer, and the temperature of the preceding-stage fuel cell if the amount of heat absorption acquired by the acquisition unit is larger than the amount of heat generation acquired by the acquisition unit.

6 Claims, 9 Drawing Sheets

(51) Int. Cl.
*H01M 8/04537* (2016.01)
*H01M 8/04746* (2016.01)
*H01M 8/04858* (2016.01)
*H01M 8/0612* (2016.01)

(56) References Cited

FOREIGN PATENT DOCUMENTS

| | | | |
|---|---|---|---|
| JP | 03-274674 | A | 12/1991 |
| JP | 05-047395 | A | 2/1993 |
| JP | 2005-203258 | A | 7/2005 |
| JP | 2006-261025 | | 9/2006 |
| JP | 2013-009456 | A | 1/2013 |
| JP | 2013-020705 | A | 1/2013 |

FUEL CELL SYSTEM AND FUEL CELL CONTROL METHOD

TECHNICAL FIELD

The present invention relates to a fuel cell system and a fuel cell control method.

BACKGROUND ART

Typical solid electrolyte fuel cells require a time to raise their temperatures at cold start. Conventional fuel cell systems have therefore been mainly used as a stationary type, which is not frequently cold-started. There are, however, many demands for applying fuel cell systems to mobile objects such as vehicles. Patent Literature 1 proposes a multi-stage fuel cell stack including a small fuel cell stack and a large fuel cell stack to achieve both fast start-up and large output required by a mobile object.

CITATION LIST

Patent Literature

Patent Literature 1: European Patent No. 1507302

SUMMARY OF INVENTION

Technical Problem

Meanwhile, in Patent Literature 1, fuel pipes of the small fuel cell stack and the large fuel cell stack are cascaded. Thus, the small fuel cell stack, situated at the preceding stage, is supplied with whole reformed gas to be used in the entire fuel cell system. Consequently, a large amount of methane contained in the reformed gas causes a large endothermic reaction during power generation of the small fuel cell stack, making it difficult to maintain the temperature of the small fuel cell stack. It is therefore necessary to heat the air to be used for power generation to or above the operating temperature of the small fuel cell stack. The problem of this is that the power generation efficiency of the whole fuel cell system decreases.

The present invention has been made in view of the above problem, and an object thereof is to provide a fuel cell system and a fuel cell control method capable of achieving enhanced power generation efficiency by reducing introduction of fuel for heating air to be used for power generation.

Solution to Problem

A fuel cell system according to one aspect of the present invention: reforms fuel and supplies reformed gas to a preceding-stage fuel cell; acquires an amount of heat generation and an amount of heat absorption of the preceding-stage fuel cell; and controls at least one of an amount of current of the preceding-stage fuel cell, a flow rate of air to be supplied to a reformer, and temperature of the preceding-stage fuel cell if the acquired amount of heat absorption is larger than the acquired amount of heat generation.

Advantageous Effects of Invention

According to the present invention, it is possible to achieve enhanced power generation efficiency by reducing introduction of fuel for heating air to be used for power generation.

DESCRIPTION OF EMBODIMENTS

Embodiments of the present invention will be described below with reference to the drawings. In the illustration of the drawings, identical parts will be denoted by identical reference signs, and description thereof will be omitted.

[First Embodiment]

Figure 1:
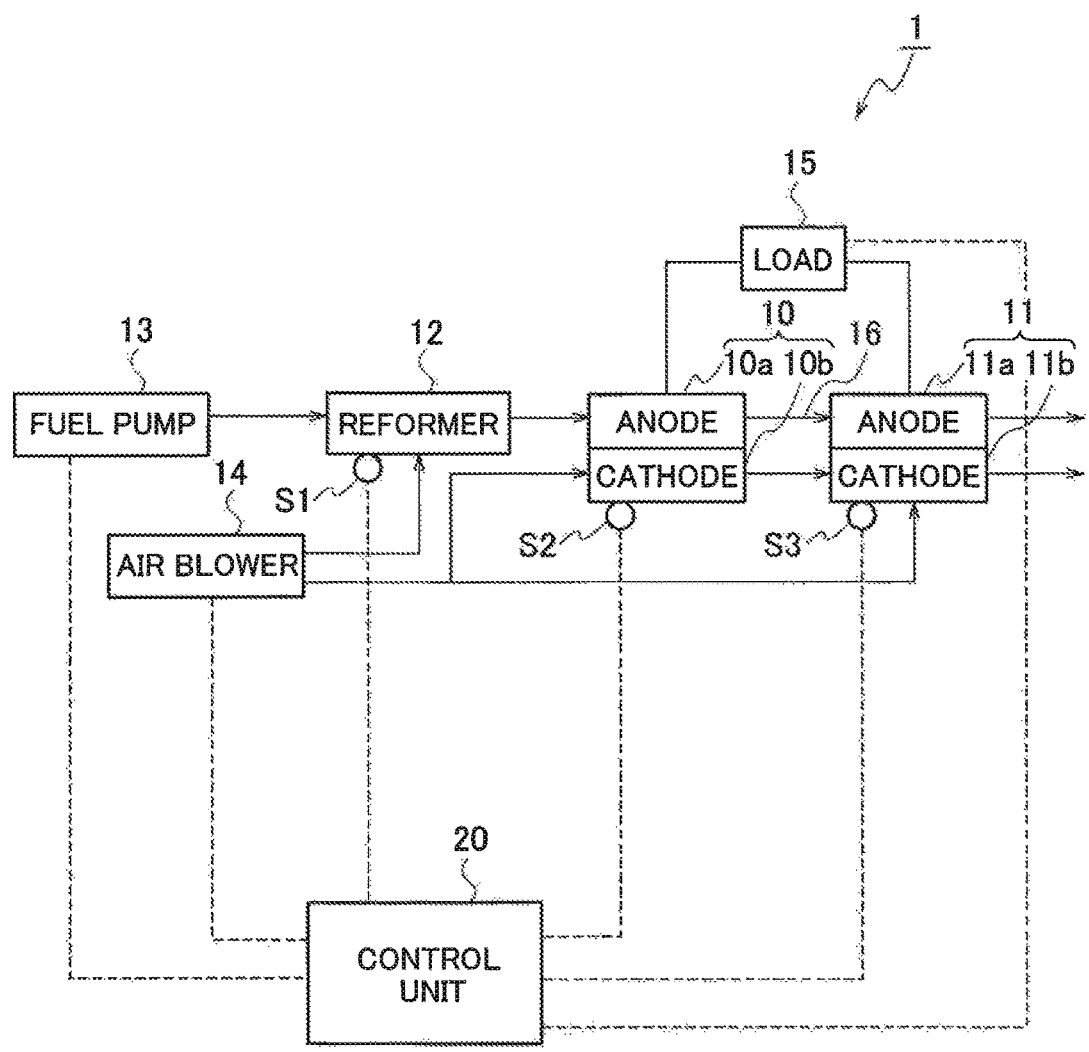
FIG. 1 is a diagram of the configuration of a fuel cell system according to a first embodiment of the present invention.

The configuration of a fuel cell system 1 according to a first embodiment will be described with reference to FIG. 1. As illustrated in FIG. 1, the fuel cell system 1 includes a preceding-stage fuel cell 10 including an anode 10a and a cathode 10b, a following-stage fuel cell 11 including an anode 11a and a cathode 11b, and a reformer 12. Reformed gas discharged from the reformer 12 is supplied to the anode 10a and further supplied to the anode 11 a via a fuel flow path 16 as well.

The fuel cell system 1 also includes a fuel pump 13 that supplies new raw fuel to the reformer 12, an air blower 14 that supplies air to the reformer 12, the cathode 10b, and the cathode 11b, a load 15 connected to the preceding-stage fuel cell 10 and the following-stage fuel cell 11, and a control unit 20. The fuel cell system 1 further includes a temperature sensor S1 that detects temperature $T_{ref}$ of the reformer 12, a sensor S2 (acquisition unit) that detects temperature $T_1$ of the preceding-stage fuel cell 10, and a temperature sensor S3 that detects temperature $T_2$ of the following-stage fuel cell 11.

The preceding-stage fuel cell 10 and the following-stage fuel cell 11 are each a solid oxide fuel cell (SOFC), for example. The preceding-stage fuel cell 10 and the following-stage fuel cell 11 generate electric power by reacting the reformed gas supplied to the anode 10a and the anode 11a with the air supplied to the cathode 10b and the cathode 11b, and supply this electric power to the load 15.

The reformer 12 reforms steam supplied from an evaporator (not illustrated), the new raw fuel supplied from the fuel pump 13, and the air supplied from the air blower 14 by using a catalytic reaction, and supplies the fuel thus reformed (reformed gas containing hydrogen gas) to the anode 10a. In doing so, the reformer 12 also supplies the reformed gas to be used at the anode 11a of the following-stage fuel cell 11 to the anode 10a at the same time.

The control unit 20 is a device that performs overall control on fuel cell system 1 and is, for example, a computer including a CPU, an ROM, an RAM, a data bus connecting them to each other, and input-output interfaces. The control unit 20 is connected to the fuel pump 13, the air blower 14, the load 15, and the temperature sensors S1 to S3. Upon acquiring required output of the load 15, the control unit 20 acquires the detection signals of the temperature sensors S1 to S3. Using the acquired detection signals, the control unit 20 outputs control signals to the fuel pump 13 and the air blower 14 to control the amount of fuel to be discharged from the fuel pump 13 and the amount of air to be discharged from the air blower 14. The control unit 20 then supplies electric power satisfying the required output of the load 15 from the preceding-stage fuel cell 10 and the following-stage fuel cell 11.

Moreover, the control unit 20 stores maps to be used to control the fuel cell system 1. Specifically, the control unit 20 stores maps illustrated in FIGS. 2 to 5. The maps illustrated in FIGS. 2 to 5 will be described along with a flowchart in FIG. 7 mentioned below.

Figure 6:
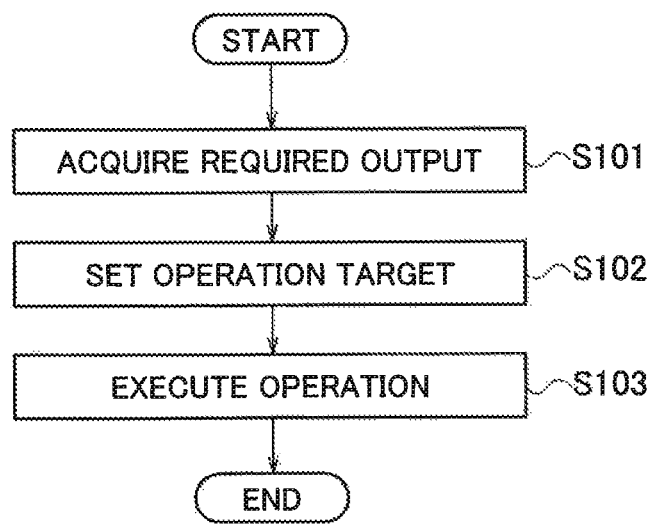
FIG. 6 is a flowchart describing an example of the operation of the fuel cell system 1 according to the first embodiment of the present invention.
Figure 7:
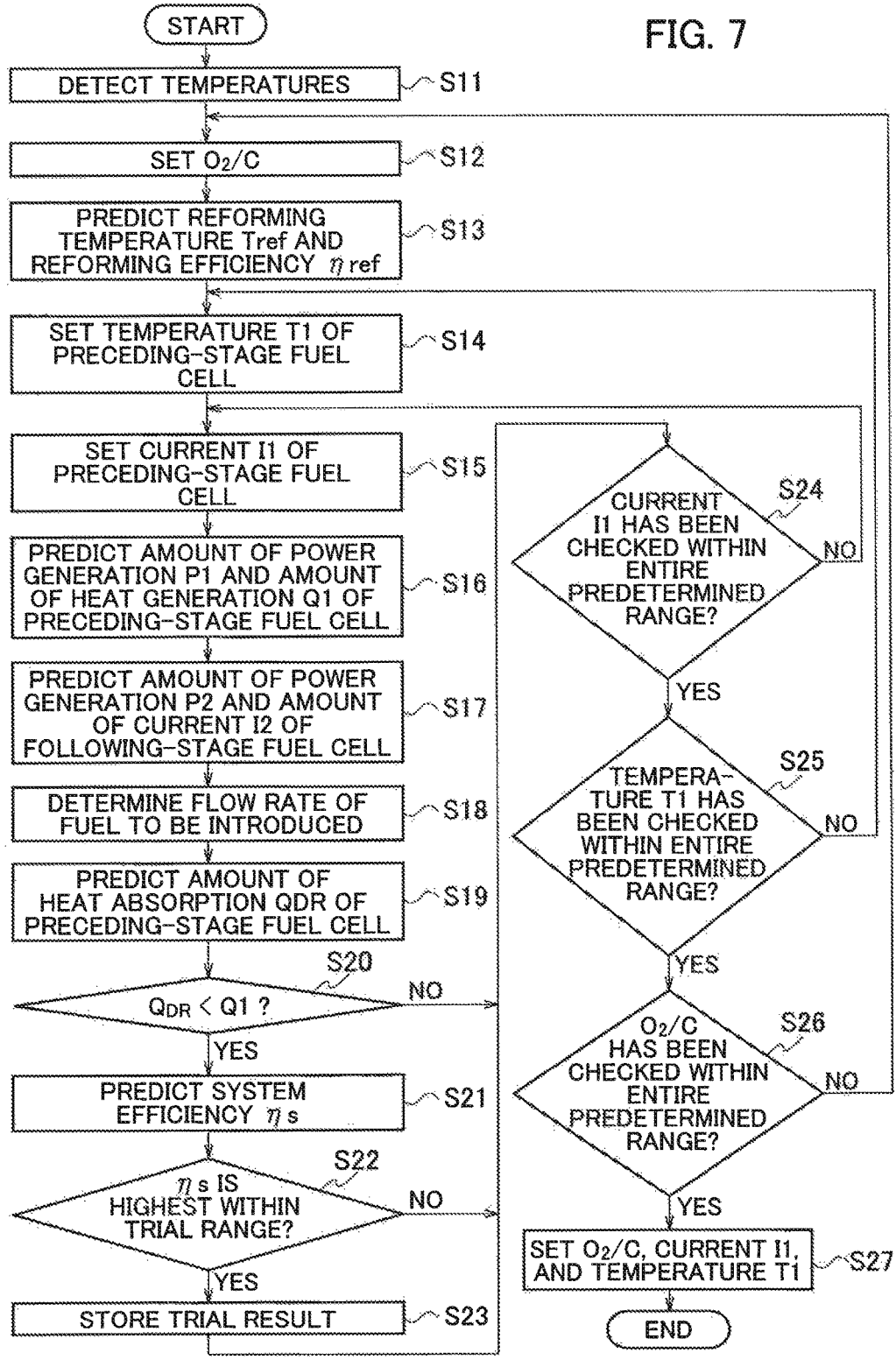
FIG. 7 is a flowchart describing an example of the operation of e cell system 1 according to the first embodiment of the present invention.

Next, the operation of the fuel cell system 1 according to the first embodiment of the present invention with the above configuration will be described with reference to the flowcharts illustrated in FIGS. 6 and 7. First, the operation of the fuel cell system 1 will be schematically described with reference to FIG. 6.

In step S101, the control unit 20 acquires required output of the load 15.

In step S102, the control 20 sets an operation target for satisfying the required output of the load 15.

In step S103, the control unit 20 executes operation of the preceding-stage fuel cell 10 and the following-stage fuel cell 11 based on the operation target set in step S102.

Next, details of the operation in step S102, illustrated in FIG. 6, will be described with reference to FIG. 7.

In step S11, the control unit 20 detects the temperature $T_{ref}$ of the reformer 12, the temperature $T_1$ of the preceding-stage fuel cell 10, and the temperature $T_2$ of the following-stage fuel cell 11.

In step S12, the control unit 20 sets $O_2/C$. $O_2/C$ is the ratio of the molar flow rate of oxygen in the air to be introduced into the reformer 12 to the molar flow rate of carbon atoms in the new raw fuel to be introduced into the reformer 12.

Figure 2:
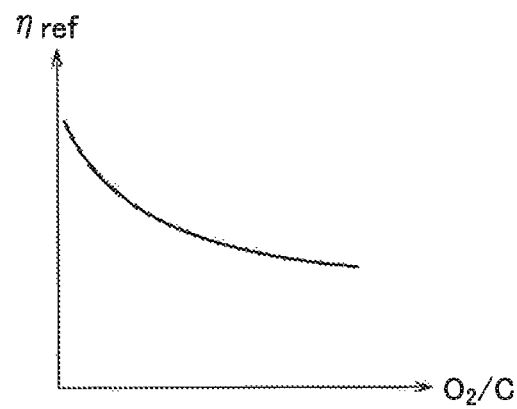
FIG. 2 is a diagram of a map referred to by the fuel cell system and illustrating the correlation between reforming efficiency $\eta_{ref}$ and $O_2/C$ according to the first embodiment of the present invention.

In step S13, the control unit 20 predicts reforming efficiency $\eta_{ref}$ and the temperature $T_{ref}$ of the reformer 12 which are obtainable by introducing $O_2/C$ set in step S12 into the reformer 12, by referring to the map illustrated in FIG. 2. As illustrated in FIG. 2, the reforming efficiency $\eta_{ref}$ decreases as $O_2/C$ increases. The reforming efficiency $\eta_{ref}$ is expressed by equation (1).
[Math. 1]

$$\eta_{ref} = \Delta H_{ref}/\Delta H \qquad (1)$$

where $\Delta H_{ref}$ is the amount of enthalpy change after reforming, and $\Delta H$ is the amount of enthalpy change at introduction. For both of them, the definition of lower heating value is employed here as a scale for the enthalpy change. The present case is not limited to this definition.

In step S14, the control unit 20 sets the temperature $T_1$ of the preceding-stage fuel cell 10.

In step S15, the control unit 20 sets current $I_1$ of the preceding-stage fuel cell 10.

In step S16, the control unit 20 predicts an amount of power generation $P_1$ and an amount of heat generation $Q_1$ of the preceding-stage fuel cell 10 by using the temperature $T_1$ and the current $I_1$ set in step S14 and step S15.

The amount of heat generation $Q_1$ will now be described.

In the first embodiment, the reformed gas to be used at the preceding-stage fuel cell 10 and the following-stage fuel cell 11 is supplied to the anode 10a. In other words, the reformed gas necessary for the power generation of the two fuel cells is supplied to the anode 10a. The reformed gas contains methane, so that a large amount of methane is supplied to the anode 10a.

When the preceding-stage fuel cell 10 generates electric power, oxide ions move through the electrolyte in the preceding-stage fuel cell 10 in accordance with the amount of current generated. Then, the reformed gas, the oxide ions, and electrons react with each other, thus resulting in an amount of heat generation $Q_1$ equivalent to the difference obtained by subtracting the electric power from the heat of formation by the chemical reaction. The amount of heat generation $Q_1$ is expressed by equation (2).
[Math. 2]

$$Q_1 = \Delta H_1 - P_1 \qquad (2)$$

where $\Delta H_1$ is the amount of enthalpy change of the fuel used in the power generation of the preceding-stage fuel cell 10.

On the other hand, the reformed gas, which is determined by the operating temperature of the reformer 12 and the new raw fuel supplied, is subjected to internal reforming inside the preceding-stage fuel cell 10 by the operating temperature of the preceding-stage fuel cell 10 and the movement of the oxide ions. More specifically, a large amount of methane and water introduced into the preceding-stage fuel cell 10 cause a steam reforming reaction, which produces hydrogen and CO. This reaction is an endothermic reaction and results in an amount of heat absorption $Q_{DR}$. If this amount of heat absorption $Q_{DR}$ exceeds the amount of heat generation $Q_1$, the operating point of the preceding-stage fuel cell 10 is shifted, thereby lowering the efficiency of the whole fuel cell system 1. The amount of heat absorption $Q_{DR}$ is expressed by equation (3).
[Math. 3]

$$Q_{DR} = \Delta H_{out1} + \Delta H_1 - \Delta H_{ref} \qquad (3)$$

where $\Delta H_{out1}$ is the amount of enthalpy change of the unused fuel at the exit of the preceding-stage fuel cell 10.

Figure 3:
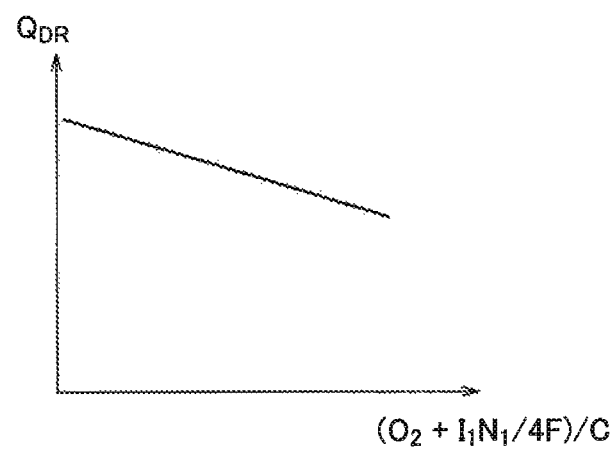
FIG. 3 is a diagram of a map referred to by the fuel cell system and illustrating the correlation between an amount of heat absorption $Q_{DR}$ and $(O_2+I_1N_1/4F)/C$ according to the first embodiment of the present invention.

As illustrated in FIG. 3, there is a correlation between the amount of heat absorption $Q_{DR}$, and the ratio of the molar flow rate of oxygen in the air to be introduced into the reformer 12 to the molar flow rate of carbon atoms in the new raw fuel to be introduced into the reformer 12 and the amount of oxygen $I_1/4F$ (F: Faraday constant) of the oxide ions that move with the current $I_1$, which is generated during power generation of the preceding-stage fuel cell 10. Specifically, the amount of heat absorption $Q_{DR}$ decreases as an amount of air $O_2$ to be introduced into the reformer 12 or an amount of current $I_1N_1$ of the preceding-stage fuel cell 10 increases. Thus, the control unit 20 can decrease the amount of heat absorption $Q_{DR}$ by controlling the amount of air $O_2$ or the amount of current $I_1N_1$ of the preceding-stage fuel cell 10 with reference to the map illustrated in FIG. 3. Note that $N_1$ is the number of preceding-stage fuel cells 10 piled in the stack.

In step S17, the control unit 20 predicts an amount of power generation $P_2$ and current $I_2$ of the following-stage fuel cell 11. Specifically, the control unit 20 predicts the amount of power generation $P_2$ by subtracting the amount of power generation $P_1$ of the preceding-stage fuel cell 10 from an amount of power generation P of the whole fuel cell system 1. Moreover, the control unit 20 predicts the current $I_2$ of the following-stage fuel cell 11 by using the predicted amount of power generation $P_2$.

In step S18, the control unit 20 determines the flow rate of the new raw fuel to be supplied to the reformer 12 by using the current $I_1$, the current $I_2$, and a fuel usage ratio $\eta_{FU}$. The fuel usage ratio $\eta_{FU}$ is the ratio of the new raw fuel used for power generation to the fuel introduced into the fuel cell system 1. The fuel usage ratio $\eta_{FU}$ is expressed by equation (4).
[Math. 4]

$$\eta_{FU} = \Delta H_{in}/\Delta H_{ref} \quad (4)$$

where $\Delta H_{in}$ is the total amount of enthalpy change of the fuel used for the power generation. With $\Delta H_1$ as the amount of enthalpy change of the fuel used for the power generation of the preceding-stage fuel cell 10 and $\Delta H_2$ as the amount of enthalpy change of the fuel used for the power generation of the following-stage fuel cell 11, $\Delta H_{in}$ is expressed by equation (5).
[Math. 5]

$$\Delta H_{in} = \Delta H_1 + \Delta H_2 \quad (5)$$

In step S19, the control unit 20 predicts the amount of heat absorption $Q_{DR}$ of the preceding-stage fuel cell 10.

In step S20, the control unit 20 determines whether or not the amount of heat generation $Q_1$ is larger than the amount of heat absorption $Q_{DR}$. If the amount of heat generation $Q_1$ is larger than the amount of heat absorption $Q_{DR}$ (Yes in step S20), the process proceeds to step S21. On the other hand, if the amount of heat generation $Q_1$ is smaller than or equal to the amount of heat absorption $Q_{DR}$ (No in step S20), the process proceeds to step S24.

In step S21, the control unit 20 predicts system efficiency $\eta_S$. The system efficiency $\eta_S$ is an index indicating the efficiency of the whole fuel cell system 1, and a larger value indicates better efficiency. The system efficiency $\eta_S$ is expressed by equation (6).
[Math. 6]

$$\eta_S = P/\Delta H = \eta_{ref} \times \eta_{FC} \times \eta_{FU} \quad (6)$$

where $\eta_{FC}$ is the power generation efficiency of the preceding-stage fuel cell 10 and the following-stage fuel cell 11. This power generation efficiency $\eta_{FC}$ will be described later. As described in the above equation (6), the system efficiency $\eta_S$ is represented as the product of the reforming efficiency $\eta_{ref}$, the power generation efficiency $\eta_{FC}$, and the fuel usage ratio $\eta_{FU}$.

In step S22, the control unit 20 determines whether or not the system efficiency $\eta_S$ is highest within a trial range. If the system efficiency $\eta_S$ is highest (Yes in step S22), the process proceeds to step S23. On the other hand, if the system efficiency $\eta_S$ is not highest (No in step S22), the process proceeds to step S24.

In step S23, the control unit 20 stores the trial result. Specifically, the control unit 20 records the set $O_2/C$, current $I_1$, and temperature $T_1$.

In step S24, the control unit 20 determines whether or not the current $I_1$ has been checked within an entire predetermined range. If the current $I_1$ has been checked within the entire predetermined range (Yes in step S24), the process proceeds to step S25. On the other hand, if the current $I_1$ has not been checked within the entire predetermined range (No in step S24), the process returns to step S15.

The predetermined range for the current $I_1$ will now be described.

Figure 4:
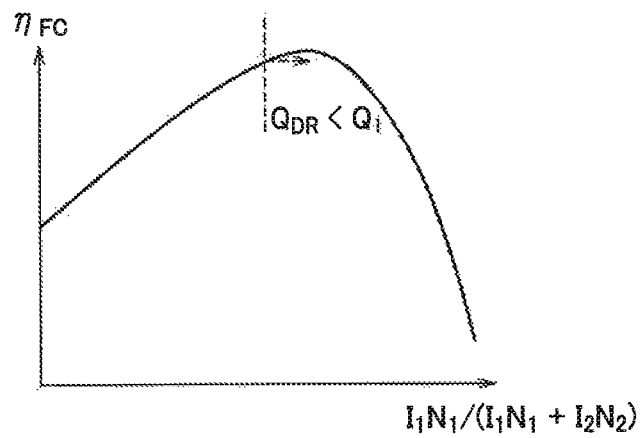
FIG. 4 is a diagram of a map referred to by the fuel cell system and illustrating the correlation between power generation efficiency $\eta_{FC}$ and $I_1N_1/(I_1N_1+I_2N_2)$ according to the first embodiment of the present invention.

As illustrated in FIG. 4, with the power generation efficiency $\eta_{FC}$ along a vertical axis and with the ratio of the amount of current $I_1N_1$ of the preceding-stage fuel cell 10 to the total amount of current of the preceding-stage fuel cell 10 and the following-stage fuel cell 11 ($I_1N_1 + I_2N_2$) along a horizontal axis, the correlation between the vertical axis and the horizontal axis represents a parabolic curve with a given peak. Note that $N_2$ is the number of following-stage fuel cells 11 piled in the stack. The power generation efficiency $\eta_{FC}$ is expressed by equation (7).
[Math. 7]

$$\eta_{FU} = P_1 + P_2/\Delta H_{in} \quad (7)$$

Figure 5:
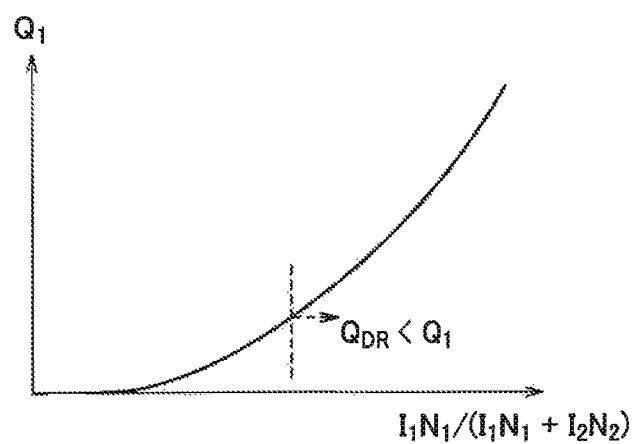
FIG. 5 is a diagram of a map referred to by the fuel cell system and illustrating the correlation between an amount of heat generation $Q_1$ and $I_1N_1/(I_1N_1+I_2N_2)$ according to the first embodiment of the present invention.

The power generation efficiency $\eta_{FC}$ rises up to the peak illustrated in FIG. 4 as the current $I_1$ increases. Also, there is a point before the peak at and above which the amount of heat generation $Q_1$ exceeds the amount of heat absorption $Q_{DR}$. More specifically, as illustrated in FIG. 5, there is a correlation in which the amount of heat generation $Q_1$ rises as the amount of current $I_1N_1$ increases, and there is a point at and above which the amount of heat generation $Q_1$ exceeds the amount of heat absorption $Q_{DR}$. Thus, the control unit 20 searches for the current $I_1$ within a range within which the amount of heat generation $Q_1$ exceeds the amount of heat absorption $Q_{DR}$ and the power generation efficiency $\eta_{FC}$ is high, by referring to the maps illustrated in FIGS. 4 and 5.

Note that the amount of heat absorption $Q_{DR}$ decreases as the amount of current $I_1N_1$ increases, as described with the map illustrated in FIG. 3, because the amount of heat generation $Q_1$ rises as the amount of current $I_1N_1$ increases, as illustrated in the map of FIG. 5.

In step S25, the control unit 20 determines whether or not the temperature $T_1$ of the preceding-stage fuel cell 10 has been checked within an entire predetermined range. If the temperature $T_1$ has been checked within the entire predetermined range (Yes in step S25), the process proceeds to step S26. If the temperature $T_1$ has not been checked within the entire predetermined range (No in step S25), the process returns to step S14.

It has been mentioned that in the map of FIG. 4 there is a point before the peak at and above which the amount of heat generation $Q_1$ exceeds the amount of heat absorption $Q_{DR}$. In other words, this means that the amount of heat generation $Q_1$ falls below the amount of heat absorption $Q_{DR}$ in a range where the amount of current $I_1N_1$ is small. In addition, the amount of heat generation $Q_1$ falls below the amount of heat absorption $Q_{DR}$ when the amount of current $I_1N_1$ is small and the exit temperature of the reformer 12 is lower than the temperature $T_1$ of the preceding-stage fuel cell 10. Thus, the control unit 20 sets a predetermined range for the temperature $T_1$ of the preceding-stage fuel cell 10 in which the temperature $T_1$ is lower than the exit temperature of the reformer 12, and searches for a temperature $T_1$ at which the amount of heat generation $Q_1$ exceeds the amount of heat absorption $Q_{DR}$.

In step S26, the control unit 20 determines whether or not $O_2/C$ has been checked within an entire predetermined range. If $O_2/C$ has been checked within the entire predetermined range (Yes in step S26), the process proceeds to step S27. On the other hand, if $O_2/C$ has not been checked within the entire predetermined range (No in step S26), the process returns to step S12. The reforming efficiency $\eta_{ref}$ decreases as $O_2/C$ increases, as illustrated in Fig. 2. On the other hand, the amount of heat absorption $Q_{DR}$ decreases as the $O_2/C$ increases, as illustrated in FIG. 3. Thus, the control unit 20 searches for $O_2/C$ at which the amount of heat generation $Q_1$ exceeds the amount of heat absorption $Q_{DR}$ and high efficiency is obtained.

In step S27, the control unit 20 sets the $O_2/C$, current $I_1$, and temperature $T_1$ stored in step S23 as an operating condition.

As described above, the fuel cell system 1 according to the first embodiment can offer the following advantageous effects.

The fuel cell system 1 predicts the amount of heat generation $Q_1$ and the amount of heat absorption $Q_{DR}$ of the preceding-stage fuel cell 10 and searches for an operating point at which the amount of heat absorption $Q_{DR}$ falls below the amount of heat generation $Q_1$, by controlling at least one of the amount of current $I_1N_1$ of the preceding-stage fuel cell 10, the flow rate of air to be supplied to the reformer 12, and the temperature $T_1$ of the preceding-stage fuel cell 10. In this way, it is not necessary to heat the air to be used for power generation to make the amount of heat absorption $Q_{DR}$ fall below the amount of heat generation $Q_1$. The fuel cell system 1 can therefore be operated at high efficiency.

Also, the fuel cell system 1 sets the temperature $T_1$ of the preceding-stage fuel cell 10, the amount of current $I_1N_1$ of the preceding-stage fuel cell 10, and the flow rate of air to be supplied to the reformer 12 based on the system efficiency $\eta_S$. In this way, the fuel cell system 1 can set an operating point with high efficiency and therefore be operated at high efficiency.

Also, the fuel cell system 1 increases the amount of heat generation $Q_1$ by increasing the amount of current $I_1N_1$, to thereby decrease the amount of heat absorption $Q_{DR}$. Specifically, the fuel cell system 1 searches for and sets a current $I_1$ with which the amount of heat generation $Q_1$ exceeds the amount of heat absorption $Q_{DR}$. In this way, it is not necessary to heat the air to be used for power generation to make the amount of heat absorption $Q_{DR}$ fall below the amount of heat generation $Q_1$. The fuel cell system 1 can therefore be operated at high efficiency.

[Second Embodiment]

Figure 12:
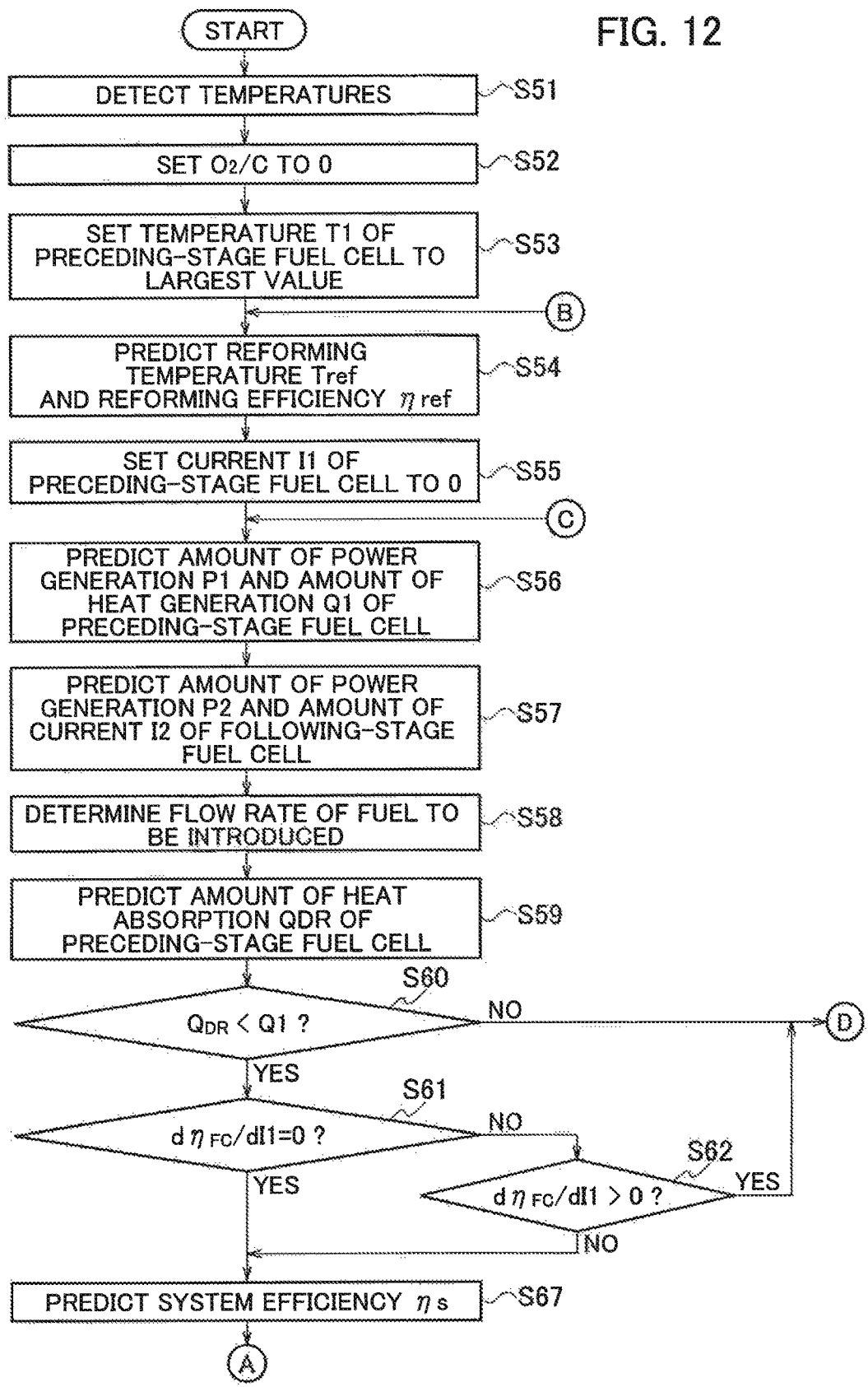
FIG. 12 is a flowchart describing an example of the operation of the fuel cell system 1 according to the second embodiment of the present invention.
Figure 13:
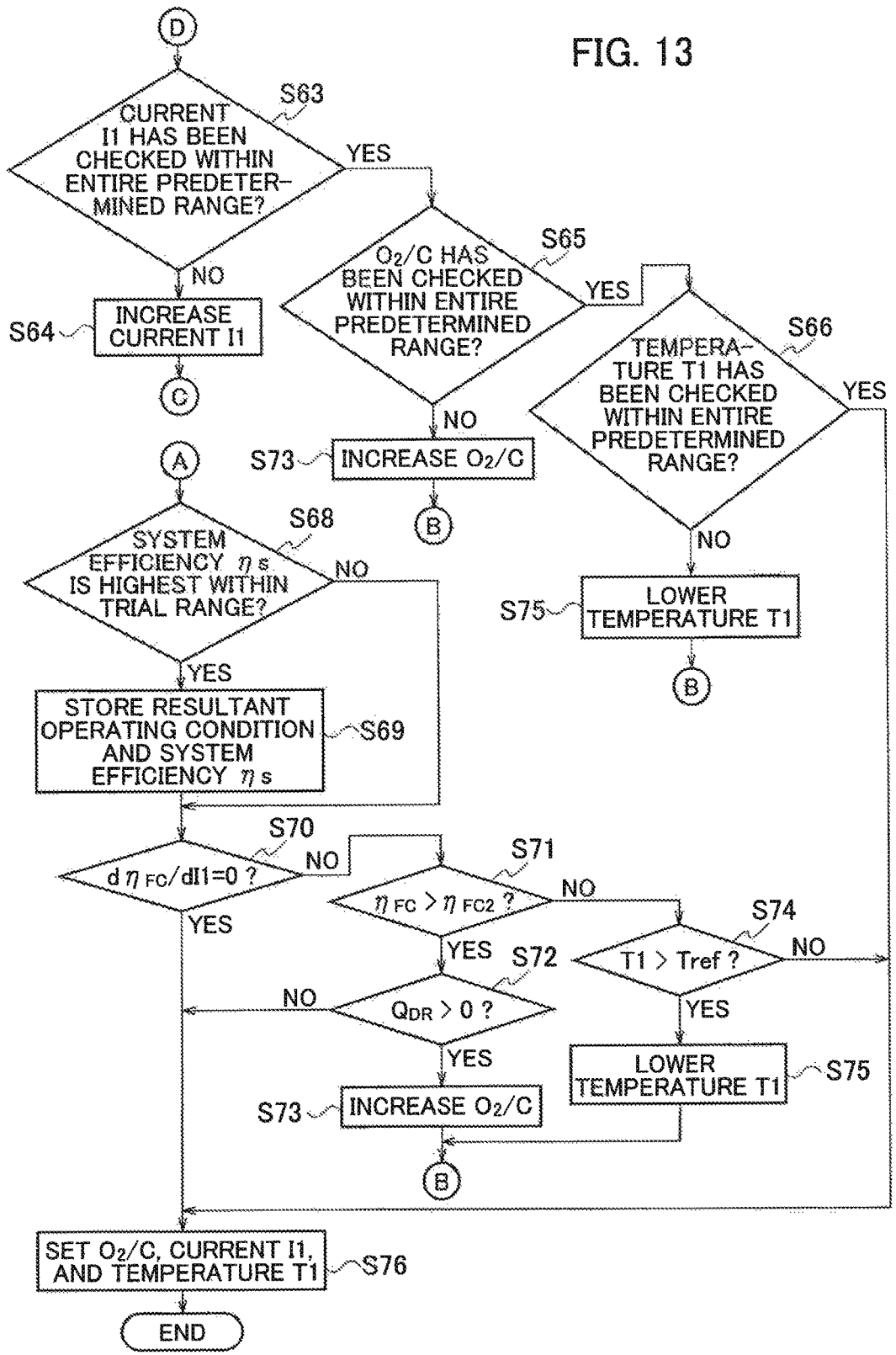
FIG. 13 is a flowchart describing the example of the operation of the fuel cell system 1 according to the second embodiment of the present invention

Next, a second embodiment of the present invention will be described. A fuel cell system 1 according to the second embodiment is identical to the above-described first embodiment in the configuration but differs in the method of calculating the operating condition. Specifically, while the first embodiment involves setting the operating condition by referring the maps illustrated in FIGS. 3 to 6, the second embodiment involves setting the operating condition by referring to maps illustrated in FIGS. 8 to 11 in addition to those in FIGS. 3 to 6, as will be discussed below. The operation of the fuel cell system according to the second embodiment will be described below in detail with reference to flowcharts illustrated in FIGS. 12 and 13.

In step S51, the control unit 20 detects the temperature $T_{ref}$ of the reformer 12, the temperature $T_1$ of the preceding-stage fuel cell 10, and the temperature $T_2$ of the following-stage fuel cell 11.

In step S52, the control unit 20 sets $O_2/C$ to 0.

In step S53, the control unit 20 sets the temperature $T_1$ of the preceding-stage fuel cell 10 to the largest possible value.

In step S54, the control unit 20 predicts the reforming efficiency $\eta_{ref}$ and the temperature $T_{ref}$ of the reformer 12 which are obtainable by introducing $O_2/C$ set in step S12 into the reformer 12, by referring to the map illustrated in FIG. 2.

In step S55, the control unit 20 sets the current $I_1$ of the preceding-stage fuel cell 10 to 0.

In step S56, the control unit 20 predicts the amount of power generation $P_1$ and the amount of heat generation $Q_1$ of the preceding-stage fuel cell 10.

In step S57, the control unit 20 predicts the amount of power generation $P_2$ and the current $I_2$ of the following-stage fuel cell 11. Specifically, the control unit 20 predicts the amount of power generation $P_2$ by subtracting the amount of power generation $P_1$ of the preceding-stage fuel cell 10 from the amount of power generation P of the whole fuel cell system 1. Moreover, the control unit 20 predicts the current $I_2$ of the following-stage fuel cell 11 by using the predicted amount of power generation $P_2$.

In step S58, the control unit 20 determines the flow rate of the new raw fuel to be supplied to the reformer 12 by using the current $I_1$, the current $I_2$, and the fuel usage ratio $\eta_{FU}$.

In step S59, the control unit 20 predicts the amount of heat absorption $Q_{DR}$ of the preceding-stage fuel cell 10.

In step S60, the control unit 20 determines whether or not the amount of heat generation $Q_1$ is larger than the amount of heat absorption $Q_{DR}$. If the amount of heat generation $Q_1$ is larger than the amount of heat absorption $Q_{DR}$ (Yes in step S60), the process proceeds to step S61. On the other hand, if the amount of heat generation $Q_1$ is smaller than or equal to the amount of heat absorption $Q_{DR}$ (No in step S60), the process proceeds to step S63.

Figure 8:
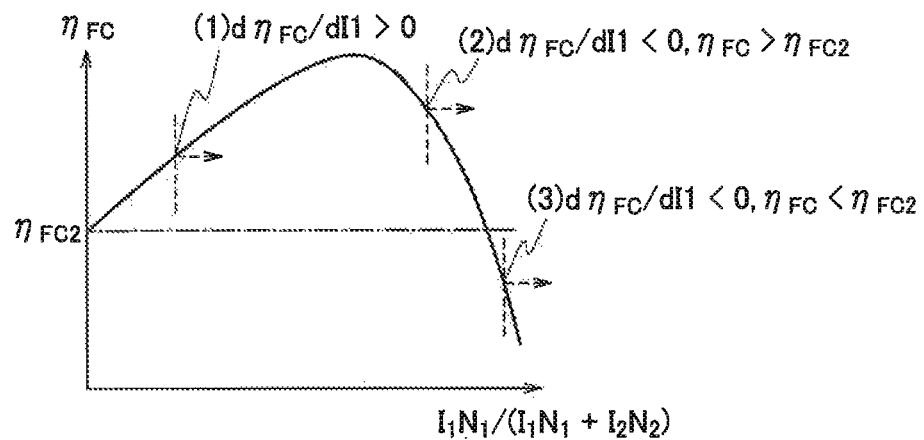
FIG. 8 is a diagram of a map referred to by a fuel cell system according to a second embodiment of the present invention and illustrating the correlation between the power generation efficiency $\eta_{FC}$ and $I_1N_1/(I_1N_1+I_2N_2)$.

In step S61, the control unit 20 determines whether or not a gradient $d\eta_{FC}/dI_1$ is 0. If the gradient $d\eta_{FC}/dI_1$ is 0 (Yes in step S61), the process proceeds to step S67. On the other hand, if the gradient $d\eta_{FC}/dI_1$ is not 0 (No in step S61), the process proceeds to step S62. As illustrated in FIG. 8, the gradient $d\eta_{FC}/dI_1$ is the gradient of the power generation efficiency $\eta_{FC}$ with respect to the current $I_1$ of the preceding-stage fuel cell 10.

In step S62, the control unit 20 determines whether or not the gradient $d\eta_{FC}/dI_1$ is larger than 0. If the gradient $d\eta_{FC}/dI_1$ is larger than 0 (Yes in step S62), the process proceeds to step S63. On the other hand, if the gradient $d\eta_{FC}/dI_1$ is smaller than or equal to 0 (No in step S62), the process proceeds to step S67.

In step S63, the control unit 20 determines whether or not the current $I_1$ has been checked within an entire predetermined range. If the current $I_1$ has been checked within the entire predetermined range (Yes in step S63), the process proceeds to step S65. On the other hand, if the current $I_1$ has not been checked within the entire predetermined range (No in step S63), the process proceeds to step S64.

In step S64, the control unit 20 increases the current $I_1$ within the predetermined range, and the process returns to step S56. When the gradient $d\eta_{FC}/dI_1$ is not 0 but larger than 0 in step S62, it means that the power generation efficiency $\eta_{FC}$ gets closer to a peak as the amount of current $I_1N_1$ increases, as illustrated in FIG. 8. Thus, if the current $I_1$ has not been checked within the predetermined range, the control unit 20 searches for a current $I_1$ which provides the peak illustrated in FIG. 8. Meanwhile, the range to the right of (1) presented in FIG. 8 represents a range in which the amount of heat generation $Q_1$ exceeds the amount of heat absorption $Q_{DR}$.

In step S65, the control unit 20 determines whether or not $O_2/C$ has been checked within an entire predetermined range. If $O_2/C$ has been checked within the entire predetermined range (Yes in step S65), the process proceeds to step S66. On the other hand, if $O_2/C$ has not been checked within the entire predetermined range (No in step S65), the process proceeds to step S73.

In step S66, the control unit 20 determines whether or not the temperature $T_1$ of the preceding-stage fuel cell 10 has been checked within an entire predetermined range. If the temperature $T_1$ has been checked within the entire predetermined range (Yes in step S66), the process proceeds to step S76. If the temperature $T_1$ has not been checked within the entire predetermined range (No in step S66), the process proceeds to step S75.

In step S67, the control unit 20 predicts the system efficiency $\eta_S$. When the gradient $d\eta_{FC}/dI_1$ is 0 in step S61, it means that the power generation efficiency $\eta_{FC}$ is highest, as illustrated in FIG. 8, so that the system efficiency $\eta_S$ is high. Thus, the control unit 20 predicts the system efficiency $\eta_S$. Also, when the gradient $d\eta_{FC}/dI_1$ is smaller than or equal to 0, it means that the power generation efficiency $\eta_{FC}$ is to the right of the peak, as illustrated in FIG. 8. In this case, the system efficiency $\eta_S$ decreases as the amount of current $I_1N_1$ increases, but there is still a range in which the system efficiency $\eta_S$ is high, depending on the amount of current $I_1N_1$. Thus, the control unit 20 predicts the system efficiency $\eta_S$.

In step S68, the control unit 20 determines whether or not the system efficiency $\eta_S$ is highest within a trial range. If the system efficiency $\eta_S$ is highest (Yes in step S68), the process proceeds to step S69. On the other hand, if the system efficiency $\eta_S$ is not highest (No in step S68), the process proceeds to step S70.

In step S69, the control unit 20 stores the resultant operating condition and system efficiency $\eta_S$.

In step S70, the control unit 20 determines whether or not the gradient $d\eta_{FC}/dI_1$ is 0. If the gradient $d\eta_{FC}/dI_1$ is 0 (Yes in step S70), the process proceeds to step S76. On the other hand, if the gradient $d\eta_{FC}/dI_1$ is not 0 (No in step S70), the process proceeds to step S71.

In step S71, the control unit 20 determines whether or not the power generation efficiency $\eta_{FC}$ is higher than power generation efficiency $\eta_{FC2}$. The power generation efficiency $\eta_{FC2}$ (second power generation efficiency) is power generation efficiency which is obtainable by using only the following-stage fuel cell 11 to generate electric power corresponding to the requested output of the load 15 at the detected the temperature $T_2$. If the power generation efficiency $\eta_{FC}$ is higher than the power generation efficiency $\eta_{FC2}$ (Yes in step S71), the process proceeds to step S72. On the other hand, if the power generation efficiency $\eta_{FC}$ is lower than or equal to the power generation efficiency $\eta_{FC2}$ (No in step S71), the process proceeds to step S74.

The control unit 20 determines whether or not the power generation efficiency $\eta_{FC}$ is higher than the power generation efficiency $\eta_{FC2}$ in step S71 in order to determine whether the operating condition falls in a range (2) or range (3) illustrated in FIG. 8. The range (2) illustrated in FIG. 8 is a range in which the gradient $d\eta_{FC}/dI_1$ is smaller than 0 and the power generation efficiency $\eta_{FC}$ is higher than the power generation efficiency $\eta_{FC2}$. On the other hand, the range (3) illustrated in FIG. 8 is a range in which the gradient $d\eta_{FC}/dI_1$ is smaller than 0 and the power generation efficiency $\eta_{FC}$ is lower than the power generation efficiency $\eta_{FC2}$.

Figure 9:
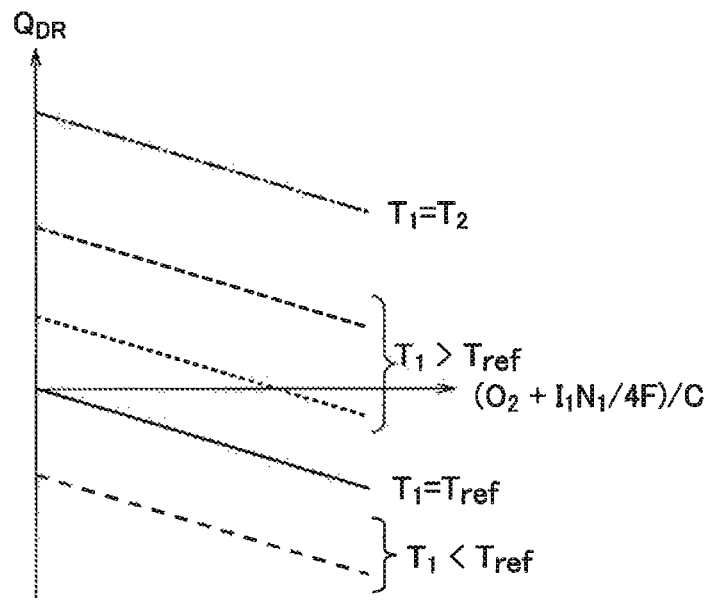
FIG. 9 is a diagram of a map illustrating the correlation between the amount of heat absorption $Q_{DR}$ and $(O_2+I_1N_1/4F)/C$ according to the second embodiment of the present invention.

If the operating condition falls in the range (2) illustrated in FIG. 8, the control unit 20 increases the flow rate of air to be supplied to the reformer 12, as will be described later. This is because increasing the flow rate of air to be supplied to the reformer 12 decreases the amount of heat absorption $Q_{DR}$, as illustrated in FIG. 9.

On the other hand, if the operating condition falls in the range (3) illustrated in FIG. 8, the power generation efficiency $\eta_{FC}$ is lower than the power generation efficiency $\eta_{FC2}$, and the efficiency of the whole fuel cell system 1 will therefore be better if operated only with the following-stage fuel cell 11. Thus, the control unit 20 lowers the temperature $T_1$ of the preceding-stage fuel cell 10 to decrease the amount of power generation $P_1$ and the amount of heat absorption $Q_{DR}$ of the preceding-stage fuel cell 10.

In step S72, the control unit 20 determines whether or not the amount of heat absorption $Q_{DR}$ is larger than 0. If the amount of heat absorption $Q_{DR}$ is larger than 0 (Yes in step S72), the process proceeds to step S73. On the other hand, if the amount of heat absorption Qua is smaller than or equal to 0 (No in step S72), the process proceeds to step S76.

In step S73, the control unit 20 increases $O_2/C$ within a predetermined range, and the process returns to step S54. More specifically, in step S73, since the operating condition falls in the range (2) illustrated in FIG. 8, the control unit 20 increases $O_2/C$ to decrease the amount of heat absorption $Q_{DR}$ to search for an operating condition with better efficiency.

In step S74, the control unit 20 determines whether or not the temperature $T_1$ of the preceding-stage fuel cell 10 is higher than the temperature $T_{ref}$ of the reformer 12. If the temperature $T_1$ is higher than the temperature $T_{ref}$ (Yes in step S74), the process proceeds to step S75. On the other hand, if the temperature $T_1$ is lower than or equal to the temperature $T_{ref}$ (No in step S74), the process proceeds to step S76.

In step S75, the control unit 20 lowers the temperature $T_1$ within a predetermined range, and the process returns to step S54. As illustrated in FIG. 9, the amount of heat absorption $Q_{DR}$ decreases as the temperature $T_1$ decreases. More specifically, the amount of heat absorption $Q_{DR}$ decreases the further the temperature $T_1$ falls below the temperature $T_{ref}$. Meanwhile, in FIG. 9, the temperature $T_1$ is highest when being equal to the temperature $T_2$, and the temperature $T_1$ becomes lower the further it shifts toward the bottom of the map illustrated in FIG. 9.

Figure 10:
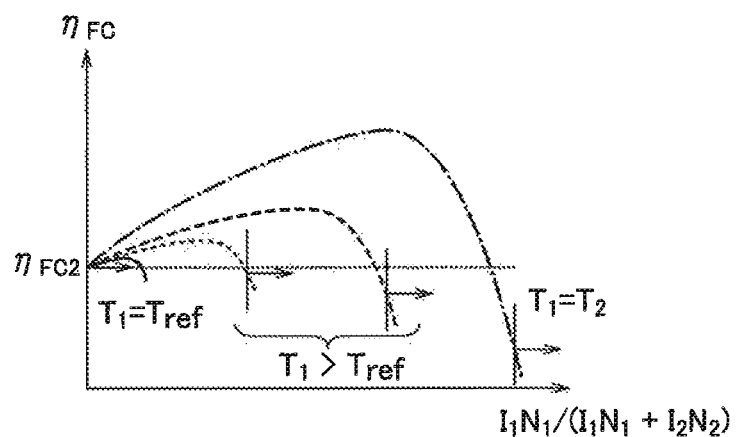
FIG. 10 is a diagram of a map illustrating the correlation between the power generation efficiency $\eta_{FC}$ and $I_1N_1/(I_1N_1+I_2N_2)$ according to the second embodiment of the present invention.

Also, as illustrated in FIG. 10, the peak of the power generation efficiency $\eta_{FC}$ shifts such that the further the temperature $T_1$ falls below the temperature $T_{ref}$, the smaller the amount of current $I_1N_1$ is required for the power generation efficiency $\eta_{FC}$ to peak. Also, as illustrated in FIG. 10, the peak of the power generation efficiency $\eta_{FC}$ is higher than the power generation efficiency $\eta_{FC2}$, and the range to the right of any of the arrows is a range in which the amount of heat generation $Q_1$ exceeds the amount of heat absorption $Q_{DR}$. Specifically, as illustrated in FIG. 10, by lowering the temperature $T_1$, the control unit 20 can search for an operating condition with which the power generation efficiency $\eta_{FC}$ is high and the amount of heat generation $Q_1$ is larger than the amount of heat absorption $Q_{DR}$, with a small amount of current $I_1N_1$.

Figure 11:
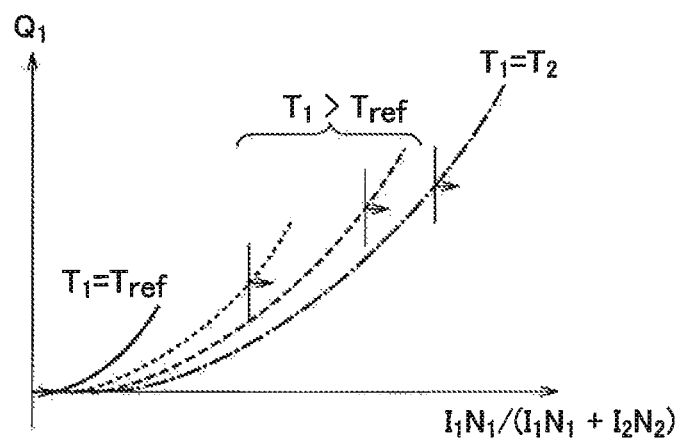
FIG. 11 is a diagram of a map illustrating the correlation between the amount of heat generation $Q_1$ and $I_1N_1/(I_1N_1+I_2N_2)$ according to the second embodiment of the present invention.

Also, as illustrated in FIG. 11, the amount of heat generation $Q_1$ decreases as the temperature $T_1$ decreases, and the range to the right of any of the arrows is a range in which the amount of heat generation $Q_1$ exceeds the amount of heat absorption $Q_{DR}$. Specifically, as illustrated in FIG. 11, although the amount of heat generation $Q_1$ decreases as the temperature $T_1$ decreases, a range in which the amount of heat generation $Q_1$ exceeds the amount of heat absorption $Q_{DR}$ can be obtained with a small amount of current $I_1N_1$. Thus, by lowering the temperature $T_1$, the control unit 20 searches for an operating condition with which the amount of heat generation $Q_1$ exceeds the amount of heat absorption $Q_{DR}$ with a small amount of current $I_1N_1$.

In step S76, the control unit 20 sets the $O_2/C$, the current $I_1$, and the temperature $T_1$ stored in step S69 as the operating condition.

As described above, the fuel cell system 1 according to the second embodiment can offer the following advantageous effects.

When the gradient $d\eta_{FC}/dI_1$ of the power generation efficiency $\eta_{FC}$ with respect to the current $I_1$ of the preceding-stage fuel cell 10 is positive, the fuel cell system 1 further increases the current $I_1$ of the preceding-stage fuel cell 10 to search for an operating point with high power generation efficiency $\eta_{FC}$. In this way, the fuel cell system 1 can set an operating point with high efficiency and therefore be operated at high efficiency.

Also, when determining the operating condition, the fuel cell system 1 sets the flow rate of air to be supplied to the reformer 12 to 0 and checks the possible operating temperature of the preceding-stage fuel cell 10 for operation from its highest temperature. Thus, the fuel cell system 1 sets the operating condition by determining that the point at which the gradient $d\eta_{FC}/dI_1$ is 0 is the point at which the power generation efficiency $\eta_{FC}$ is highest. In this way, the fuel cell system 1 can set an operating point with high efficiency and therefore be operated at high efficiency.

Also, when the gradient $d\eta_{FC}/dI_1$ is negative, further increasing the current $I_1$ will lower the system efficiency $\eta_S$, and the fuel cell system 1 therefore predicts the system efficiency $\eta_S$ under the operating condition at that point. If the predicted system efficiency $\eta_S$ is highest within a trial range, the fuel cell system 1 sets this operating condition. In this way, the fuel cell system 1 can set an operating point with high efficiency and therefore be operated at high efficiency.

Also, when the gradient $d\eta_{FC}/dI_1$ is negative and the power generation efficiency $\eta_{FC}$ is higher than the power generation efficiency $\eta_{FC2}$, the fuel cell system 1 increases the flow rate of air to be supplied to the reformer 12 to decrease the amount of heat absorption $Q_{DR}$. By searching for an operating point at which the amount of heat absorption $Q_{DR}$ falls below the amount of heat generation $Q_1$ in this manner, it is not necessary to heat the air to be used for power generation to make the amount of heat absorption $Q_{DR}$ fall below the amount of heat generation $Q_1$. The fuel cell system 1 can therefore be operated at high efficiency.

Also, when the gradient $d\eta_{FC}/dI_1$ is negative and the power generation efficiency $\eta_{FC}$ is lower than the power generation efficiency $\eta_{FC2}$, the fuel cell system 1 lowers the temperature $T_1$ of the preceding-stage fuel cell 10. This is because the system efficiency $\eta_S$ will be higher if power generation is performed not by just using only the following-stage fuel cell 11 instead of supplying air to the reformer 12 to decrease the amount of heat absorption $Q_{DR}$ and decrease the reforming efficiency $\eta_{ref}$. By lowering the temperature $T_1$, the fuel cell system 1 searches for an operating point at which the amount of heat absorption $Q_{DR}$ falls below the amount of heat generation $Q_1$. Thus, the fuel cell system 1 does not set an operating condition that decreases the system efficiency $\eta_S$ to maintain the temperature $T_1$, but lowers the temperature $T_1$ to search for an operating point at which the amount of heat absorption $Q_{DR}$ falls below the amount of heat generation $Q_1$. In this way, the fuel cell system 1 can set an operating point with higher efficiency than the power generation efficiency $\eta_{FC2}$ and therefore be operated at high efficiency.

While embodiments of the present invention have been described above, it should not be understood that the statement and the drawings constituting part of this disclosure limit the present invention. Various alternative embodiments, examples, and operation techniques will become apparent to those skilled in the art from this disclosure.

REFERENCE SIGNS LIST 10 preceding-stage fuel cell
11 following-stage fuel cell
12 reformer
S2 sensor
20 control unit

The invention claimed is:

1. A fuel cell system including a preceding-stage fuel cell and a following-stage fuel cell connected to the preceding-stage fuel cell via a fuel flow path, comprising:
a reformer that reforms fuel and supplies reformed gas to the preceding-stage fuel cell; and
a control unit that predicts an amount of heat generation of the preceding-stage fuel cell based on an amount of current of the preceding-stage fuel cell and predicts an amount of heat absorption of the preceding-stage fuel cell based on a flow rate of the fuel to be supplied to the reformer,
wherein the control unit controls at least one of the amount of current of the preceding-stage fuel cell, a flow rate of air to be supplied to the reformer, and temperature of the preceding-stage fuel cell if the predicted amount of heat absorption is larger than the predicted amount of heat generation.

2. The fuel cell system according to claim 1, wherein the control unit sets an operating condition based on system efficiency being a product of reforming efficiency of the reformer, power generation efficiency of the preceding-stage fuel cell and the following-stage fuel cell, and a fuel usage ratio indicating a ratio of the fuel used for power generation to the fuel supplied to the fuel cell system.

3. The fuel cell system according to claim 2, wherein the control unit increases the amount of current of the preceding-stage fuel cell if the amount of heat absorption is larger than the amount of heat generation.

4. The fuel cell system according to claim 3, wherein after increasing the amount of current, the control unit further increases the amount of current if a gradient of the power generation efficiency with respect to the amount of current is positive, whereas the control unit predicts the system efficiency if the gradient is zero or negative.

5. The fuel cell system according to claim 4, wherein the control unit supplies air to the reformer if the power generation efficiency is higher than second power generation efficiency which is obtainable by performing power generation with only the following-stage fuel cell, whereas the control unit lowers the temperature of the preceding-stage fuel cell if the power generation efficiency is lower than the second power generation efficiency.

6. A fuel cell control method including a preceding-stage fuel cell and a following-stage fuel cell connected to the preceding-stage fuel cell via a fuel flow path, comprising:
  reforming fuel and supplying reformed gas to the preceding-stage fuel cell;
  predicting an amount of heat generation of the preceding-stage fuel cell based on an amount of current of the preceding-stage fuel cell and predicting an amount of heat absorption of the preceding-stage fuel cell based on a flow rate of the fuel to be supplied to a reformer; and
  controlling at least one of the amount of current of the preceding-stage fuel cell, a flow rate of air to be supplied to the reformer, and temperature of the preceding-stage fuel cell if the predicted amount of heat absorption is larger than the predicted amount of heat generation.

* * * * *